United States Patent
Lang et al.

(10) Patent No.: US 12,529,416 B2
(45) Date of Patent: Jan. 20, 2026

(54) CONTINUOUSLY VARIABLE TRANSMISSION

(71) Applicant: DEERE & COMPANY, Moline, IL (US)

(72) Inventors: Matthias Lang, Mannheim (DE); David Mueller, Dettenheim (DE); Frank Buhrke, Birkenau (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/814,973

(22) Filed: Aug. 26, 2024

(65) Prior Publication Data
US 2025/0075783 A1    Mar. 6, 2025

(30) Foreign Application Priority Data
Sep. 1, 2023  (EP) .................................. 23194857

(51) Int. Cl.
*F16H 47/04* (2006.01)
*F16H 57/021* (2012.01)
*F16H 57/02* (2012.01)

(52) U.S. Cl.
CPC ........... *F16H 47/04* (2013.01); *F16H 57/021* (2013.01); *F16H 2057/02056* (2013.01); *F16H 2057/02086* (2013.01)

(58) Field of Classification Search
CPC ................... F16H 47/04; F16H 57/021; F16H 2057/02056; F16H 2057/02086
See application file for complete search history.

(56) References Cited

U.S. PATENT DOCUMENTS 5,679,085 A * 10/1997 Fredriksen ........ B60W 30/1819
                                                          74/731.1
5,868,640 A *  2/1999 Coutant .................. F16H 47/04
                                                          475/78
5,888,162 A *  3/1999 Moeller .................. F16H 47/04
                                                          475/72

(Continued)

FOREIGN PATENT DOCUMENTS

EP           2193289 A1    6/2010

OTHER PUBLICATIONS

European Search Report in Application No. 23194857.1, dated Feb. 9, 2024, 22 pages.

*Primary Examiner* — Timothy Hannon
(74) *Attorney, Agent, or Firm* — Harness, Dickey & Pierce, P.L.C.

(57) ABSTRACT

A continuously variable transmission has an input shaft, an output shaft, an intermediate shaft connected to the output shaft and to the input shaft via one or more tooth engagements, a variator transmission arranged on the intermediate shaft, a hydrostatic transmission, a housing, and a bearing plate. The housing at least partially encloses the input shaft, the output shaft, and the intermediate shaft. The hydrostatic transmission is arranged geometrically parallel to the variator transmission, and the power flow can be split therebetween. The output shaft is offset horizontally and vertically with respect to the input shaft. The housing is in one piece and open on one side. The components are held in the housing by the bearing plate in the mounted state. One or more of the housing and the bearing plate have flat surfaces on outer sides, which are configured to fasten module components on the continuously variable transmission.

20 Claims, 2 Drawing Sheets

(56) References Cited

U.S. PATENT DOCUMENTS

| | | | |
|---|---|---|---|
| 6,565,471 B2* | 5/2003 | Weeramantry | F16H 47/04 475/82 |
| 2010/0051410 A1 | 3/2010 | Iwaki et al. | |
| 2010/0203998 A1* | 8/2010 | Bailly | F16H 47/04 475/214 |
| 2011/0015022 A1* | 1/2011 | Stoeckl | B60K 6/442 475/83 |
| 2012/0125730 A1* | 5/2012 | Moloney | F16H 61/0403 192/48.1 |
| 2013/0226416 A1* | 8/2013 | Seipold | F16H 47/04 701/55 |
| 2013/0281244 A1* | 10/2013 | Vaughn | F16H 47/04 475/72 |
| 2015/0292607 A1* | 10/2015 | Heindl | B60K 17/356 475/207 |
| 2021/0041021 A1* | 2/2021 | Dvorak, Sr. | F16H 61/46 |
| 2022/0290748 A1* | 9/2022 | Gono | B60K 17/10 |
| 2023/0098005 A1* | 3/2023 | Dalla Palma | F16H 47/04 701/60 |

* cited by examiner

CONTINUOUSLY VARIABLE TRANSMISSION

CROSS-REFERENCE TO RELATED APPLICATIONS

This application claims priority to European Patent Application No. 23194857.1, filed on Sep. 1, 2023, which is hereby incorporated by reference herein.

TECHNICAL FIELD

The present disclosure relates generally to a continuously variable transmission.

BACKGROUND

Continuously variable transmissions may be useful in vehicles and other machines.

SUMMARY

The disclosure relates to a continuously variable transmission with a hydraulic component for use in vehicles.

Continuously variable transmissions with hydraulic components are used in agricultural vehicles. The operation allows the drive power to be split over a hydraulic and a mechanical branch of the transmission, together with continuously variable shifting of the respective gear stages or gear ranges. In agriculture, different driving requirements are placed on the drive. Firstly, driving on motor routes is common for transport work at a low to medium torque. Secondly, it is common to cultivate areas with the aid of medium to high torque attachments. Hydraulic continuously variable transmissions have proven to be advantageous in this field. Maintenance and robustness are advantageous in these fields, together with a long service life.

Hydraulic continuously variable transmissions generally have a hydrostatic unit, a shifting range, and a device for switching between forward and reverse operation. In order to increase the efficiency of such a transmission, the number of tooth engagements between the gearwheels used is usually reduced.

The installation space of the transmission is limited by the areas connected to it; this applies in particular to the overall length in the vehicle direction of such transmissions. At the same time, the overall height, the extent in the vertical direction, is likewise limited by specifications of the axle positions within the transmission in relation to the input shaft and the output shaft, so that an arbitrary reduction of the installation space cannot be made.

The present disclosure solves the issues addressed by providing a continuously variable transmission that has a reduced installation space. Furthermore, the tooth engagements are reduced in the disclosure.

The continuously variable transmission according to the disclosure has an input shaft, an output shaft, an intermediate shaft, a variator transmission, a hydrostatic transmission, a housing and a bearing plate, wherein the housing at least partially encloses all shafts and components (e.g., the input shaft, the output shaft, the intermediate shaft, the variator transmission, and the hydrostatic transmission—or, any combination of some of the shafts and components) and has an input side for power introduction and an output side for power output, wherein the continuously variable transmission has an installation position which is provided during operation, wherein the input shaft is connected to the intermediate shaft via one or more tooth engagements by means of gearwheels, wherein the variator transmission is arranged on the intermediate shaft, wherein the intermediate shaft is connected to the output shaft via one or more tooth engagements, wherein the hydrostatic transmission is arranged geometrically parallel to the variator transmission in a side view in the installation position, and the power flow can be split between the hydrostatic transmission and the variator transmission, wherein the output shaft is offset horizontally and vertically with respect to the input shaft in the installation position, as viewed in the axial direction (FIG. 2), wherein the housing is in one piece and open on one side, and the components within the continuously variable transmission are held in the housing by the bearing plate in the mounted state, wherein the housing and/or the bearing plate have/has flat surfaces on the input and/or output side, which are configured to fasten module components on an outer side of the continuously variable transmission.

The input shaft conducts the drive power from the drive shaft into the continuously variable transmission. The drive power is output to connected modules via the intermediate shaft and the output shaft. The variator transmission is able to provide different speed ranges for the drive of the vehicle by means of gearwheel couplings and clutches. The hydrostatic transmission within the continuously variable transmission represents a power branch, via which part of the power is conducted parallel to the variator transmission. The disclosure thus enables a compact design of a continuously variable transmission with a shortened overall length. Due to the offset and the geometrically parallel arrangement, i.e. in the installation position on the same section in the longitudinal direction, of the shafts, additional installation space is saved in length and can thus be used for further modules, such as a lubricant supply or a four-wheel drive.

In one development, the output shaft (30) has a forward-reverse clutch (90).

By providing the forward-reverse clutch on the output shaft, additional installation space can be saved in the length of the transmission.

In a further embodiment of the disclosure, the output shaft has a forward clutch and the intermediate shaft has a reverse clutch.

The arrangement allows the space-saving accommodation of the reverse clutch and the associated idler gearwheel for reversing the direction of rotation.

In one development, the output shaft has a reverse clutch and the intermediate shaft has a forward clutch.

The arrangement allows the space-saving accommodation of the reverse clutch and the associated idler gearwheel for reversing the direction of rotation.

In a further embodiment of the disclosure, the variator transmission is an epicyclic transmission and/or a superimposed transmission.

The configuration as an epicyclic transmission allows a small installation space with a high spread of the transmission at the same time. The epicyclic transmission has a high efficiency due to the reduced number of tooth engagements. The embodiment as a superimposed transmission allows the hydrostatic transmission and its power output to be used as an additional input for the variator transmission.

In one development, the continuously variable transmission has an auxiliary shaft. The auxiliary shaft can be used for the arrangement of the hydrostatic transmission.

In a further embodiment of the disclosure, the intermediate shaft is connected via one or two tooth engagements to an input of the hydrostatic transmission; an output of the hydrostatic transmission is connected to an input of the variator transmission by means of a tooth engagement.

Reducing the tooth engagements improves the efficiency of the continuously variable transmission and the effect on noise and ride comfort.

In one development, the output shaft is shorter than the input shaft and is arranged offset in the axial direction with respect to the input shaft (as viewed in FIG. 1) in the installation position.

The shortening of the output shaft reduces the installation space in the longitudinal direction of the continuously variable transmission. The offsetting of the output shaft causes all gearwheels of the input and output shaft to be on a perpendicular plane, either with a tooth flank or with the centers of the tooth width. The arrangement provides a uniform dimension for mounting the gearwheels and the shaft in the bearing plate. The bearing plate can therefore be designed in a flat form without projections. This in turn leads to material savings, weight reduction and a robust seal between the housing and the bearing plate, as a complicated sealing geometry is avoided.

According to one embodiment, the hydrostatic transmission (60) is arranged in the lowest position under all other shafts in an installation position.

The arrangement of the hydrostatic transmission in the lowest position in the installation position allows for a spatial distribution, in which the input shaft and output shaft are arranged in a higher position and are simultaneously offset with respect to one another in a horizontal and vertical direction. (The horizontal direction is horizontal in the view of FIG. 2, and the vertical direction is vertical in the view of FIG. 2.) By means of this arrangement, the required installation space can be greatly reduced in length, since the individual components are arranged in parallel.

In a further embodiment of the disclosure, the arranged gearwheels lie on one side in the interior of the housing in the installation position in the longitudinal direction with the tooth flank on the same plane, or with the center of the respective tooth width on a common plane, which lies perpendicularly with respect to the shafts.

The alignment of all gearwheels on one side of the transmission as viewed in the transverse direction offers the possibility of forming a common bearing in the bearing plate of the housing. The arrangement allows for a flat end for the bearing plate, with the result that it is likewise equipped with a continuous plane. This is particularly advantageous for further connecting modules to the continuously variable transmission.

In one development, the input shaft is arranged at the top position above all other shafts in a side view in the installation position.

The arrangement at the top position, together with the hydrostatic transmission in the lowest position, makes it possible for installation space to be saved and allows the compact arrangement of the hydrostatic transmission and variator transmission in a parallel version. The total length of the continuously variable transmission is reduced and the total amount of material used is reduced.

In a further embodiment of the disclosure, the bearing plate is of open or closed configuration.

In the open configuration, the bearing plate may have openings for passing through consumables, e.g. lubricant. Openings can likewise be provided for hydraulic lines, for electrical lines or even for mechanical shafts or connections. The configuration enables the direct connection of further function modules to the housing or the bearing plate of the continuously variable transmission.

Further embodiments of the disclosure are described with reference to the figures.

Other features and aspects will become apparent by consideration of the detailed description, claims, and accompanying drawings.

BRIEF DESCRIPTION OF THE DRAWINGS

The detailed description of the drawings refers to the accompanying figures.

DETAILED DESCRIPTION

Figure 1:
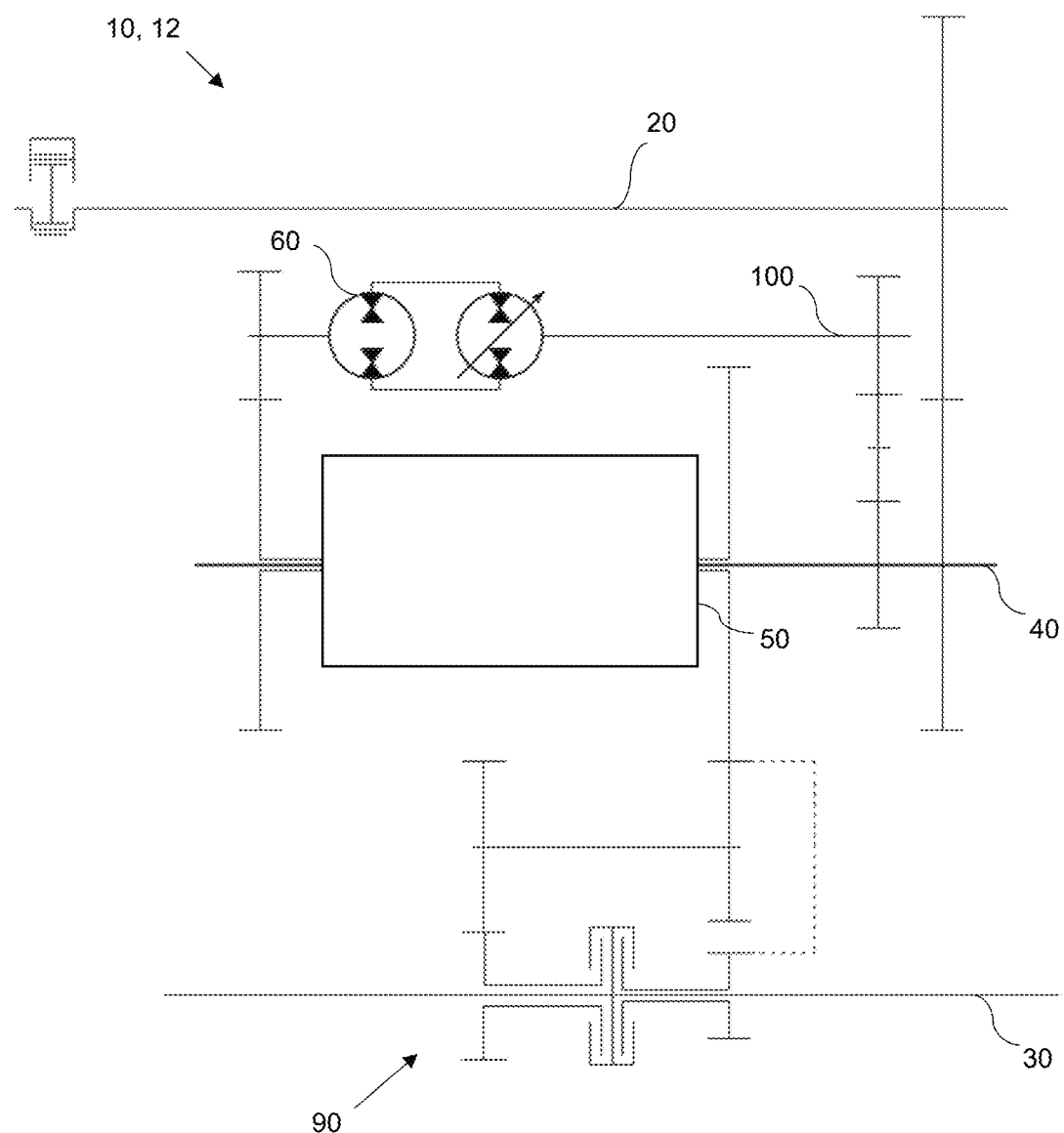
FIG. 1 shows a diagram of the continuously variable transmission.

The continuously variable transmission 10 for a vehicle 12 has an input shaft 20 which is connected to the intermediate shaft 40 via at least one tooth engagement. The intermediate shaft 40 is connected firstly to an input of the variator transmission 50, and secondly by means of further tooth engagements to the auxiliary shaft 100, which in turn is connected to the input of the hydrostatic transmission 60. On an output side of the hydrostatic transmission 60, the introduction into an input of the variator transmission 50 is carried out by means of a further tooth engagement. The variator transmission 50 is connected to the forward-reverse unit 90 and its clutch by way of an output by means of a tooth engagement. Downstream of the forward-reverse unit 90, the power is output to connected modules and to the traction drive.

The input shaft 20 may have a toothing system on one side which transmits the power to the intermediate shaft 40. The ratio of the intermediate shaft 40 to the auxiliary shaft 100 can be carried out with a direction of rotation reversal, as shown in FIG. 1. The hydrostatic transmission 60 represents one power branch, and the variator transmission 50 represents another. The power branches are summed in the variator transmission 50, and the sum is output to the forward-reverse unit 90 by means of a toothing system. The forward-reverse unit 90 selects either forward or reverse travel by way of a clutch.

The variator transmission 50 can be configured as an epicyclic transmission, wherein the output torque and the output speed are determined here by means of superposition, which is to say by the occurring speed and torque differences of the two power branches.

FIG. 1 shows a so-called stick diagram, in which the functional relationships of the shafts and elements are reproduced. Thus, the local arrangement of the shafts is not shown. The hydrostatic transmission 60 is provided in the disclosure at the lowest point, with the result that the output shaft 30 is arranged in a central position. FIG. 1 does not oppose the arrangement but describes the method of operation of the continuously variable transmission 10 in a two-dimensional reproduction.

FIG. 1 shows that the toothing systems of the input shaft 20 and the intermediate shaft 40 are arranged in one plane.

Figure 2:
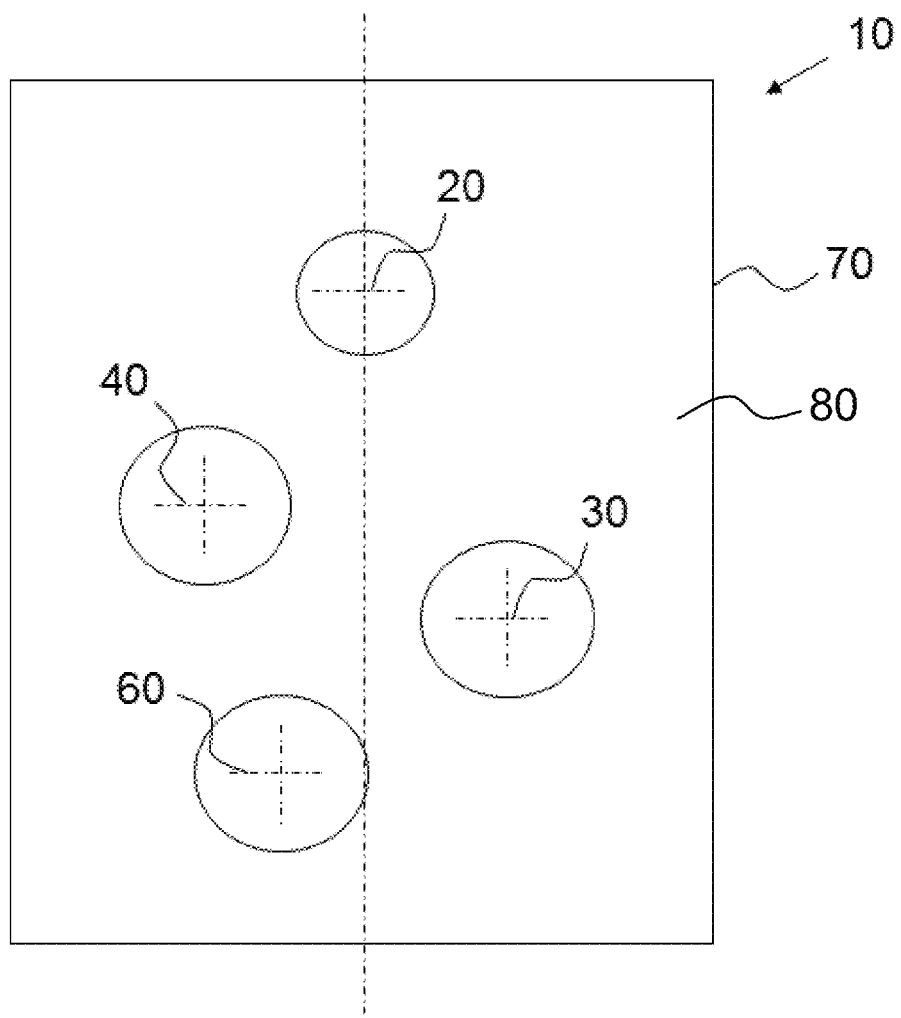
FIG. 2 shows a view in the transverse direction of the installation position with the positions of the shafts in the continuously variable transmission.

FIG. 2 describes one embodiment of the continuously variable transmission 10 with a shaft arrangement in a longitudinal view in the axial direction. This view illustrates the horizontal and vertical offsets of the shafts. The housing 70 encloses the individual components of the continuously variable transmission 10 at least partially. The housing is covered or closed by the bearing plate 80. The bearing plate 80 may have openings, through which consumables are introduced or mechanical connections are established. The bearing plate 80 can also be arranged in a completely sealing configuration, with the result that only mechanical connections by means of shafts are realized, wherein the shafts are sealed.

The input shaft 20 is in the top position in the installation position. By way of this arrangement, the spacing between the input and output shaft 20, 30 can be increased, in order to arrange all components on the respective shaft sections. The intermediate shaft 40 is arranged horizontally and vertically offset underneath. (The horizontal direction is horizontal in the view of FIG. 2, and the vertical direction is vertical in the view of FIG. 2.) The intermediate shaft 40 comprises the variator transmission 50 and is connected to the input shaft 20 by means of a tooth engagement.

The output shaft 30 is arranged below the intermediate shaft 40 offset horizontally and vertically with respect to the input shaft 20 and to the intermediate shaft 40. (The horizontal direction is horizontal in the view of FIG. 2, and the vertical direction is vertical in the view of FIG. 2.) This arrangement has the advantage that the installation space for the variator transmission 50, as well as for the hydrostatic transmission 60, can be optimally arranged in the housing 70. Furthermore, it is thus possible to arrange both transmissions 50, 60 parallel to each other.

The hydrostatic transmission 60 is arranged in the lowest position in the continuously variable transmission 10 in the installation position. The arrangement allows optimum use of installation space, as well as easy access for maintenance within the housing 70.

The power path of the continuously variable transmission 10 is conducted via the input shaft 20 and is split on the intermediate shaft 40 via one or more tooth engagements between the hydrostatic transmission 60 and the variator transmission 50. The power path is merged again downstream of the hydrostatic transmission 60 in the variator transmission 50, wherein the variator transmission 50 is configured as a superimposed transmission. The power path is then conducted to the output shaft 30 via the forward-reverse clutch 90.

The proposed continuously variable transmission 10 enables a compact and (as viewed along the shaft in the installation space length) short design that enables an advantageous integration into the drive train of vehicles. The disclosure extends the application possibilities, as well as a modular structure of the drive train. Further modules and components in a standardized design can be connected to the flat outer surfaces of the continuously variable transmission 10 with reduced complexity. The continuously variable transmission 10 allows scaling over further model series, as well as standardization of the modules for connection.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and" or "or") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A continuously variable transmission comprising:
an input shaft,
an output shaft,
an intermediate shaft,
a variator transmission,
a hydrostatic transmission, and
a housing and a bearing plate, wherein the housing includes an interior that at least partially encloses the input shaft, the output shaft, and the intermediate shaft, and has an input side for power introduction and an output side for power output,
wherein the continuously variable transmission has an installation position which is provided during operation,
wherein the input shaft is connected to the intermediate shaft via one or more tooth engagements,
wherein the variator transmission is arranged on the intermediate shaft,
wherein the intermediate shaft is connected to the output shaft via one or more tooth engagements, and
wherein the hydrostatic transmission is arranged geometrically parallel to the variator transmission and relative to an axis of at least one of the input shaft, the output shaft and the intermediate shaft, and power input into the input shaft can be split between the hydrostatic transmission and the variator transmission, the output shaft is offset horizontally and vertically with respect to the input shaft in the installation position, in an axial direction, the housing is in one piece and open on one side, and at least the input shaft, the output shaft, the intermediate shaft, the variator transmission, and the hydrostatic transmission are held in the housing by the bearing plate in a mounted state, and one or more of the housing and the bearing plate have flat surfaces on outer sides, the flat surfaces being configured to support module components on the continuously variable transmission.

2. The continuously variable transmission of claim 1, wherein the output shaft has a forward-reverse clutch.

3. The continuously variable transmission of claim 1, wherein the output shaft has a forward clutch and the intermediate shaft has a reverse clutch.

4. The continuously variable transmission of claim 1, wherein the output shaft has a reverse clutch and the intermediate shaft has a forward clutch.

5. The continuously variable transmission of claim 1, wherein the variator transmission includes an epicyclic transmission, a superimposed transmission, or both an epicyclic transmission and a superimposed transmission.

6. The continuously variable transmission of claim 1, wherein the continuously variable transmission has an auxiliary shaft.

7. The continuously variable transmission of claim 1, wherein the intermediate shaft is connected via one or two tooth engagements to an input of the hydrostatic transmission, and an output of the hydrostatic transmission is connected to an input of the variator transmission by a tooth engagement.

8. The continuously variable transmission of claim 1, wherein the output shaft is shorter than the input shaft and is arranged offset in the axial direction with respect to the input shaft in the installation position.

9. The continuously variable transmission of claim 1, wherein the hydrostatic transmission is arranged in a lowest position under each of the input shaft, the output shaft, and the intermediate shaft in an installation position.

10. The continuously variable transmission of claim 1, further comprising gearwheels disposed on one side in the interior of the housing in the installation position with a tooth flank being co-planar, or disposed with a center of a respective tooth width on a common plane, which lies perpendicularly with respect to each of the input shaft, the output shaft, and the intermediate shaft.

11. The continuously variable transmission of claim 1, wherein the input shaft is arranged at a top position above each of the input shaft, the output shaft, and the intermediate shaft all in a side view in the installation position.

12. The continuously variable transmission of claim 1, wherein the bearing plate is of open or closed configuration.

13. A vehicle comprising:
   a continuously variable transmission comprising:
      an input shaft,
      an output shaft,
      an intermediate shaft,
      a variator transmission,
      a hydrostatic transmission, and
      a housing and a bearing plate, wherein the housing includes an interior that at least partially encloses the input shaft, the output shaft, and the intermediate shaft, and has an input side for power introduction and an output side for power output,
   wherein the continuously variable transmission has an installation position which is provided during operation,
   wherein the input shaft is connected to the intermediate shaft via one or more tooth engagements,
   wherein the variator transmission is arranged on the intermediate shaft,
   wherein the intermediate shaft is connected to the output shaft via one or more tooth engagements,
   wherein the hydrostatic transmission is arranged geometrically parallel to the variator transmission relative to an axis of each of the input shaft, the output shaft and the intermediate shaft in a side view in the installation position, and power input through the input shaft can be split between the hydrostatic transmission and the variator transmission,
   wherein the output shaft is offset horizontally and vertically with respect to the input shaft in the installation position, as viewed in an axial direction,
   wherein the housing is in one piece and open on one side, and at least the input shaft, the output shaft, the intermediate shaft, the variator transmission, and the hydrostatic transmission are held in the housing by the bearing plate in a mounted state, and
   wherein one or more of the housing and the bearing plate have flat surfaces on outer sides, the flat surfaces being configured to support module components on the continuously variable transmission.

14. The vehicle of claim 13, wherein the output shaft has one of a forward clutch or a reverse clutch and the intermediate shaft has another of the forward clutch or the reverse clutch, or wherein the output shaft has a forward-reverse clutch.

15. The vehicle of claim 13, wherein the variator transmission includes an epicyclic transmission, a superimposed transmission, or both an epicyclic transmission and a superimposed transmission.

16. The vehicle of claim 13, wherein the intermediate shaft is connected via one or two tooth engagements to an input of the hydrostatic transmission, and an output of the hydrostatic transmission is connected to an input of the variator transmission by a tooth engagement.

17. The vehicle of claim 13, wherein the output shaft is shorter than the input shaft and is arranged offset in the axial direction with respect to the input shaft in the installation position.

18. The vehicle of claim 13, wherein the hydrostatic transmission is arranged in a lowest position under each of the input shaft, the output shaft and the intermediate shaft in an installation position.

19. The vehicle of claim 13, further comprising gearwheels disposed on one side in the interior of the housing in the installation position with a tooth flank being co-planer, or disposed with a center of a respective tooth width on a common plane, which lies perpendicularly with respect to the each of the input shaft, the output shaft, and the intermediate shaft.

20. The vehicle of claim 13, wherein the input shaft is arranged at a top position above each of the input shaft, the output shaft, and the intermediate shaft in a side view in the installation position.

\* \* \* \* \*